(12) United States Patent
Kobayashi

(10) Patent No.: US 12,107,996 B2
(45) Date of Patent: Oct. 1, 2024

(54) INSPECTION APPARATUS, METHOD FOR CONTROLLING SAME, AND STORAGE MEDIUM

(71) Applicant: CANON KABUSHIKI KAISHA, Tokyo (JP)

(72) Inventor: Masato Kobayashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/295,982

(22) Filed: Apr. 5, 2023

(65) Prior Publication Data

US 2023/0336668 A1 Oct. 19, 2023

(30) Foreign Application Priority Data

Apr. 19, 2022 (JP) ................................ 2022-069023
Sep. 9, 2022 (JP) ................................ 2022-143935

(51) Int. Cl.
*H04N 1/00* (2006.01)
*G06F 3/12* (2006.01)
*G06K 15/02* (2006.01)
*H04N 1/32* (2006.01)

(52) U.S. Cl.
CPC ..... *H04N 1/00013* (2013.01); *H04N 1/00037* (2013.01); *H04N 1/00045* (2013.01); *H04N 1/00082* (2013.01); *H04N 1/0009* (2013.01); *H04N 1/00129* (2013.01)

(58) Field of Classification Search
None
See application file for complete search history.

(56) References Cited

U.S. PATENT DOCUMENTS

| 11,415,920 | B2 | 8/2022 | Iwadate | |
| 2006/0115127 | A1* | 6/2006 | Hatayama | G06V 10/993 |
| | | | | 382/112 |
| 2013/0148987 | A1* | 6/2013 | Arakawa | G06T 7/40 |
| | | | | 399/15 |
| 2020/0019353 | A1* | 1/2020 | Okajima | G06F 3/1257 |
| 2020/0128135 | A1* | 4/2020 | Matsushita | G06F 3/1243 |

(Continued)

FOREIGN PATENT DOCUMENTS

| JP | H08202813 | * | 8/1996 | ............... G06K 9/20 |
| JP | 2005251050 | * | 9/2005 | ............... G06F 3/12 |

(Continued)

OTHER PUBLICATIONS

Extended European search Report issued in European Appln. No. 23163707.5 mailed on Aug. 1, 2023.

*Primary Examiner* — Beniyam Menberu
(74) *Attorney, Agent, or Firm* — ROSSI, KIMMS & McDOWELL LLP

(57) ABSTRACT

The present invention is related to an inspection apparatus reads a printed material; sets a setting relating to check inspection data for checking data formed on a printed material; derives data defined by a predetermined rule according to setting content set in the setting and generating check inspection data for a plurality of sections in a printed material; and detects a defect in an inspection target printed material by comparing data read in the reading from the inspection target printed material and the corresponding check inspection data generated in the generating.

17 Claims, 15 Drawing Sheets

(56) References Cited

U.S. PATENT DOCUMENTS

| | | |
|---|---|---|
| 2021/0374926 A1 | 12/2021 | Plant et al. |
| 2022/0135360 A1* | 5/2022 | Xie ................... G03G 15/5062 |
| | | 270/52.14 |
| 2023/0061533 A1 | 3/2023 | Sakai |

FOREIGN PATENT DOCUMENTS

| | | | | |
|---|---|---|---|---|
| JP | 2008171033 | * | 7/2008 | ........... G06F 3/1244 |
| JP | 2008173803 | * | 7/2008 | .............. B41J 29/46 |
| JP | 2010287098 | * | 12/2010 | ............... G06F 3/12 |
| JP | 2013156907 | * | 8/2013 | ............... B41J 21/00 |
| JP | 2016076050 | * | 5/2016 | ............... G06K 9/32 |
| JP | 2020067732 A | | 4/2020 | |
| JP | 2021111873 A | | 8/2021 | |
| JP | 2022050129 A | | 3/2022 | |

\* cited by examiner

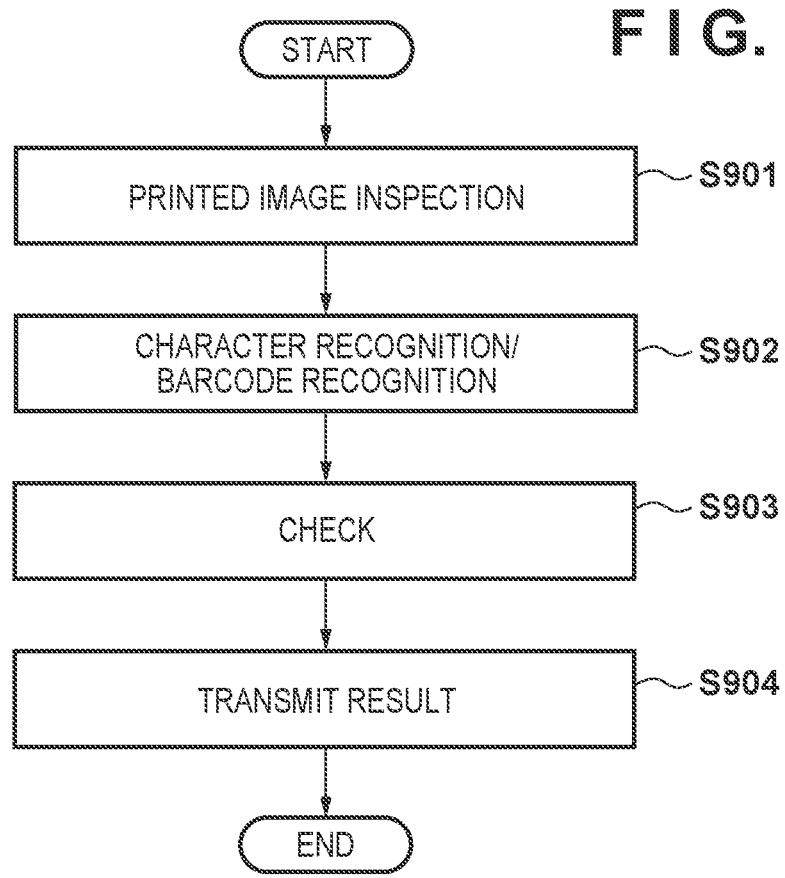

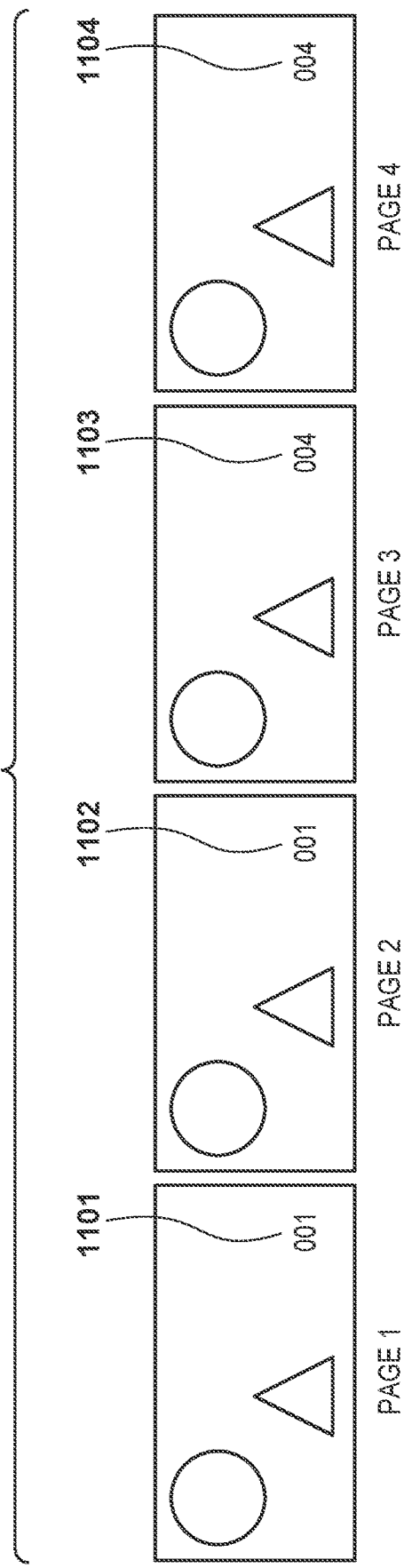

INSPECTION APPARATUS, METHOD FOR CONTROLLING SAME, AND STORAGE MEDIUM

BACKGROUND OF THE INVENTION

Field of the Invention

The present invention relates to an inspection apparatus, a method for controlling the same, and a storage medium.

Description of the Related Art

The inspection of printed materials has typically been carried out manually. However recently, apparatuses that automatically perform an inspection as part of the post-processing of printer are being used. Such inspection apparatuses register correct image data in advance. Thereafter, the submitted image data is printed out on a sheet by an image forming apparatus, and the data printed out on the sheet is read by a sensor provided in the inspection apparatus. The image data read by the sensor is compared to the correct image data initially registered to detect a defect in the printed material. Hereinafter, an inspection to detect a defect in the design portion of the printed material is referred to as printed image inspection.

Also, together with printed image inspection, an inspection of a variable region portion (variable data), such as a character string or barcode, found in variable printing is performed. Examples include a data readability inspection for checking whether or not a character string or barcode can be read and a data check inspection for checking the reading result of a character string or barcode with the correct result. Hereinafter, data readability inspections and data check inspections are referred to as data inspections. In data inspections, because the user is Optical Character Reading (OCR), character font, i.e., data including character shape images and character codes associated together, must be generated. Note that the process of generating a character font is referred to as character shape registration. Also, sequential number inspection is one type of data inspection. Sequential number inspection includes inspecting data including numerical values, such as IDs, page numbers, dates, and the like, that are sequentially listed on a page or across pages of an inspection target image.

The technique described in Japanese Patent Laid-Open No. 2020-67732 is related to data inspection in variable printing and includes generating a plurality of correct images by combining inspection regions with always fixed content and variable inspection regions with changing content. Inspection of the variable inspection regions is performed using reference data generated manually in advance and stored in a database.

However, the known technique described above has the following problems. For example, in the data inspection according to the known technique described above, manually generating and registering the reference data (check inspection data) requires a large amount of effort when there is a large amount of data to be inspected. Also, there is a problem that mistakes tend to be made when manually generating the reference data.

SUMMARY OF THE INVENTION

The present invention enables realization of a system for suitably generating check inspection data for inspection.

One aspect of the present invention provides an inspection apparatus comprising: a reading unit that reads a printed material; at least one memory device that stores a set of instructions; and at least one processor that executes the set of instructions to: set a setting relating to check inspection data for checking data formed on the printed material, derive data defined by a predetermined rule according to setting content and generate check inspection data for a plurality of sections in the printed material, and detect a defect in an inspection target printed material by comparing data read by the reading unit from the inspection target printed material and the corresponding generated check inspection data.

Another aspect of the present invention provides a control method for an inspection apparatus comprising: reading a printed material; setting a setting relating to check inspection data for checking data formed on a printed material; deriving data defined by a predetermined rule according to setting content set in the setting and generating check inspection data for a plurality of sections in a printed material; and detecting a defect in an inspection target printed material by comparing data read in the reading from the inspection target printed material and the corresponding check inspection data generated in the generating.

Still another aspect of the present invention provides a non-transitory computer-readable storage medium storing a computer program for causing a computer to execute the control method comprising: reading a printed material; setting a setting relating to check inspection data for checking data formed on the printed material; deriving data defined by a predetermined rule according to setting content set in the setting and generating check inspection data for a plurality of sections in the printed material; and detecting a defect in an inspection target printed material by comparing data read in the reading from the inspection target printed material and the corresponding check inspection data generated in the generating.

Further features of the present invention will be apparent from the following description of exemplary embodiments with reference to the attached drawings.

BRIEF DESCRIPTION OF THE DRAWINGS

FIG. 9 is a flowchart for performing an inspection according to an embodiment.

FIG. 10 is a diagram illustrating an example of an UI screen of sequential number inspection settings according to an embodiment.

FIG. 11 is a diagram illustrating an example of image configurations corresponding to sequential number inspection targets according to an embodiment.

DESCRIPTION OF THE EMBODIMENTS

Figure 1:
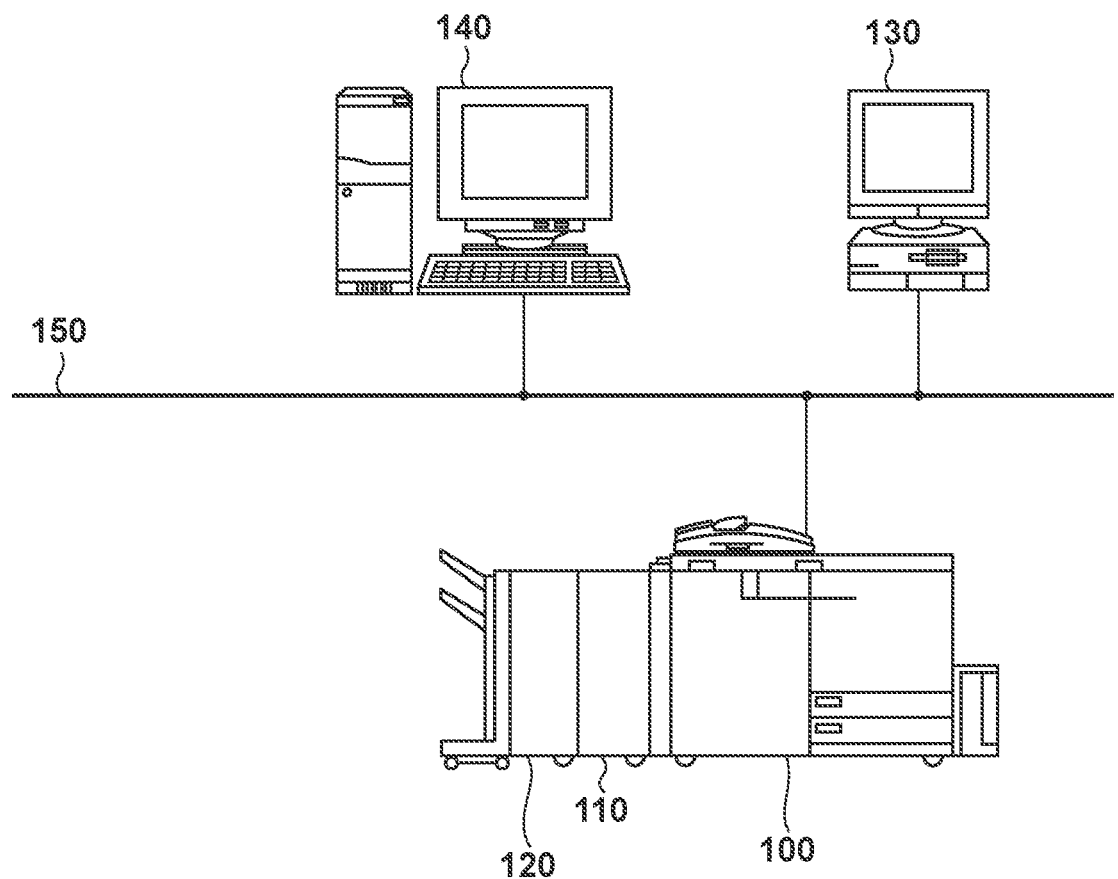
FIG. 1 is a diagram illustrating an example of a system configuration including an inspection apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Inspection System Configuration

First, an example of the configuration of a system including an inspection apparatus according to the present embodiment will be described with reference to FIG. 1. The present system includes an image forming apparatus 100, an inspection apparatus 110, a finisher 120, a client PC 130, and a printing server 140. Each apparatus is communicatively connected in both directions via a network 150. The image forming apparatus 100 performs a print out on the basis of various types of input data such as print data sent from the client PC 130 or the printing server 140.

The inspection apparatus 110 receives a printed material output from the image forming apparatus 100 and inspects whether or not there is a defect in the received printed material. The printed material output from the image forming apparatus 100 is output to the inspection apparatus 110 via a conveyance path running through the inside of the image forming apparatus 100 and the inspection apparatus 110. Note that in another configuration, a user may place a printed material discharged to a discharge tray of the image forming apparatus 100 or the like on the inspection apparatus 110. Herein, defect means a cause of a reduction in the quality of a printed material, and examples include a mark caused by color material adhering to an unintended section when printing and color loss caused by sufficient color material not adhering to the intended section.

Also, in variable printing including a character string, barcode, or similar variable region portion, the inspection apparatus 110 inspects the variable region portion. For example, a data readability inspection for checking whether or not a character string or barcode can be read and a data check inspection for checking the reading result of a character string or barcode with the correct result are performed. In other words, the inspection apparatus 110 performs data inspection including printed image inspection to detect a defect in the design portion of a printed material, data readability inspection, and data check inspection. Note that the example of the data check inspection used in the present embodiment described below is a sequential number inspection which is data with data region numerical values defined by a predetermined rule. However, no such limitation is intended, and it is sufficient that the data check inspection is data defined by a predetermined rule. Other examples will be described below in detail when describing modified examples.

The finisher 120 receives an output sheet that has been inspected by the inspection apparatus 110, switches the discharge destination on the basis of the inspection result of the inspection apparatus 110, executes post-processing (book binding, stapling, or the like) as necessary, and discharges the sheet. The image forming apparatus 100 is connected to the client PC 130 and the printing server 140 via the network 150 and is further connected to the inspection apparatus 110 and the finisher 120 via a communication cable. Other than the image forming apparatus 100, the inspection apparatus 110 is also connected to the finisher 120 via a communication cable. The present embodiment is described herein using an in-line inspection machine that performs a sequence including image forming, quality inspection (inspection), post-processing, and sheet discharge, but no such limitation is intended.

Image Forming Apparatus Configuration

Figure 2:
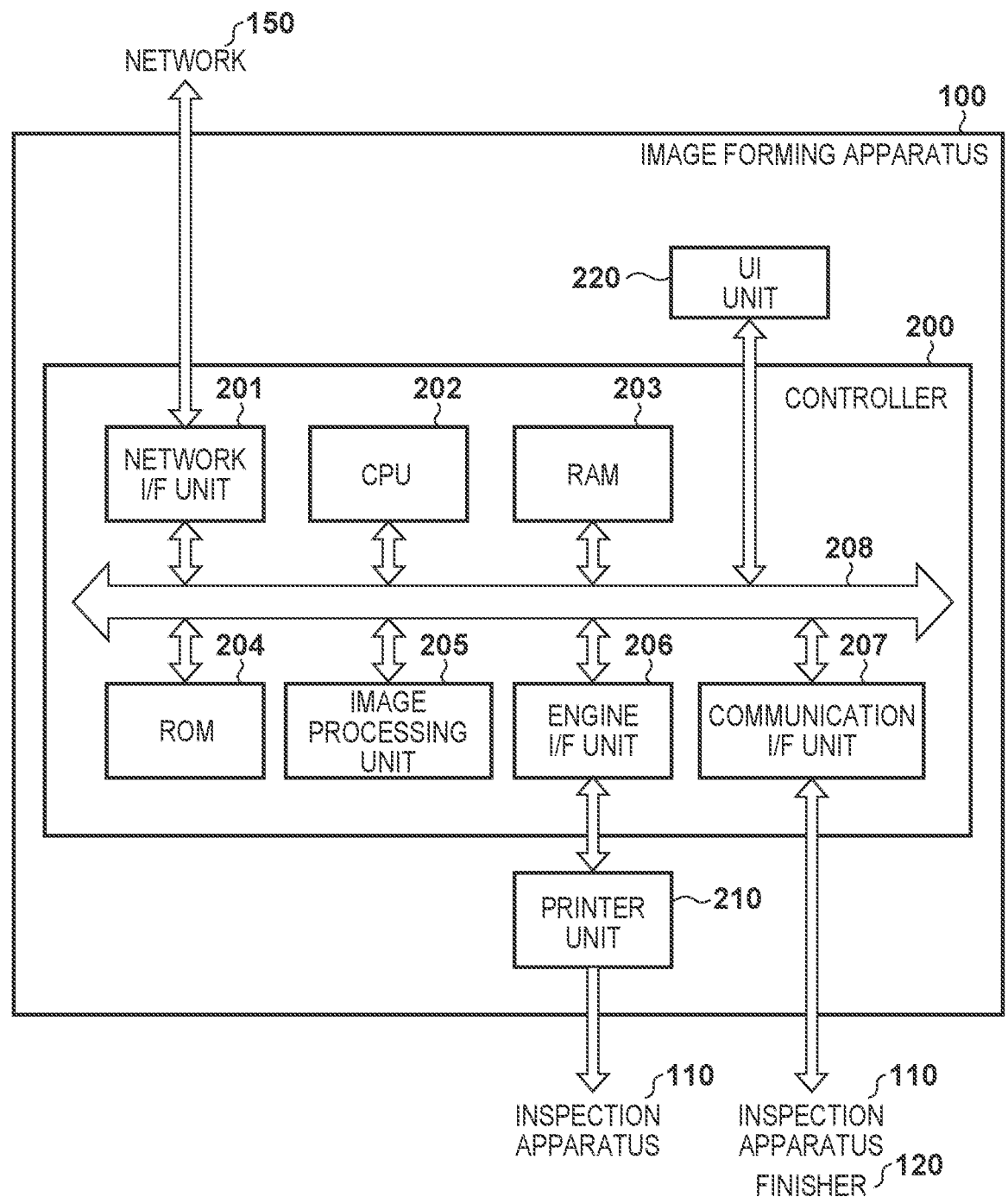
FIG. 2 is a diagram illustrating an internal configuration of an image forming apparatus 100 according to an embodiment.

Next, an example of the configuration of the image forming apparatus 100 according to the present embodiment will be described with reference to FIG. 2. The image forming apparatus 100 includes a controller 200, a printer unit 210, and a UI unit 220. The controller 200 receives an image or document from the network 150 and converts this into print data. The printer unit 210 prints the print data on a sheet. The UI unit 220 is for the user to send instructions to the image forming apparatus 100 relating to the selection of sheet information and the like. The image forming apparatus 100 is constituted by the controller 200, the printer unit 210, and the UI unit 220 described above. Also, as described below, in the present embodiment, an image reading unit 310 is provided in the inspection apparatus 110. However, no such limitation is intended, and an image reading unit may be provided in the image forming apparatus 100. In this case, the image forming apparatus 100 transmits the image data read from the printed material instead of transporting the printed material to the inspection apparatus 110.

The controller 200 includes a network I/F unit 201, a CPU 202, a RAM 203, a ROM 204, an image processing unit 205, an engine I/F unit 206, and a communication I/F unit 207. Each component can exchange data with one another via an internal bus 208. The network I/F unit 201 controls the exchange of data with an external apparatus via the network 150. The CPU 202 controls the entire image forming apparatus 100. The RAM 203 is a memory used as a working area when the CPU 202 executes various types of commands. The ROM 204 stores program data executed by the CPU 202 upon start up, setting data of the controller 200, and the like.

The image processing unit 205 executes Raster Image Processor (RIP) processing to convert the image or document data received from the network 150 into print data. Also, the image processing unit 205 can execute RIP processing to convert image data or document data received from the network 150 into correct image data. Specifically, in the RIP processing for correct image data, for example, a resolution of 600 dpi is converted to 300 dpi and an image is generated. In the RIP processing for print data, the image is generated without reducing the resolution. The engine I/F unit 206 transmits the print data to the printer unit 210. The communication I/F unit 207 controls the communication with the inspection apparatus 110 and the finisher 120.

The image forming operations will now be described. First, an image or document generated on the client PC 130 or the printing server 140 on the network 150 is transmitted as PDL data to the image forming apparatus 100 via a network (for example, a Local Area Network). The transmitted PDL data is stored in the RAM 203 via the network I/F unit 201. Also, a printing instruction from the user of the UI unit 220 is also stored in the RAM 203 via the internal bus 208. A printing instruction from the user corresponds to a selection of sheet type, for example.

The image processing unit 205 acquires the PDL data stored in the RAM 203 and executes image processing to convert the PDL data into print data. Image processing to convert into print data includes, for example, rasterization of the PDL data, conversion to multi-value bitmap data, execution of screen processing, and the like to achieve conversion into binary bitmap data. The binary bitmap data obtained by the image processing unit 205 is transmitted to the printer unit 210 via the engine I/F unit 206.

The printer unit 210 prints the received binary bitmap data on a sheet using color material. The CPU 202 sends an instruction to the printer unit 210 on the basis of the printing instruction from the user stored in the RAM 203. For example, when the instruction from the user is to print on coated paper, the CPU 202 sends an instruction to the printer unit 210 to output a sheet from a non-illustrated sheet cassette storing coated paper inside the image forming apparatus 100. In this manner, the various types of processing described above from receiving PDL data to printing on a sheet are controlled by the CPU 202 to form a full color toner image on a sheet.

Inspection Apparatus 110 Configuration

Figure 3:
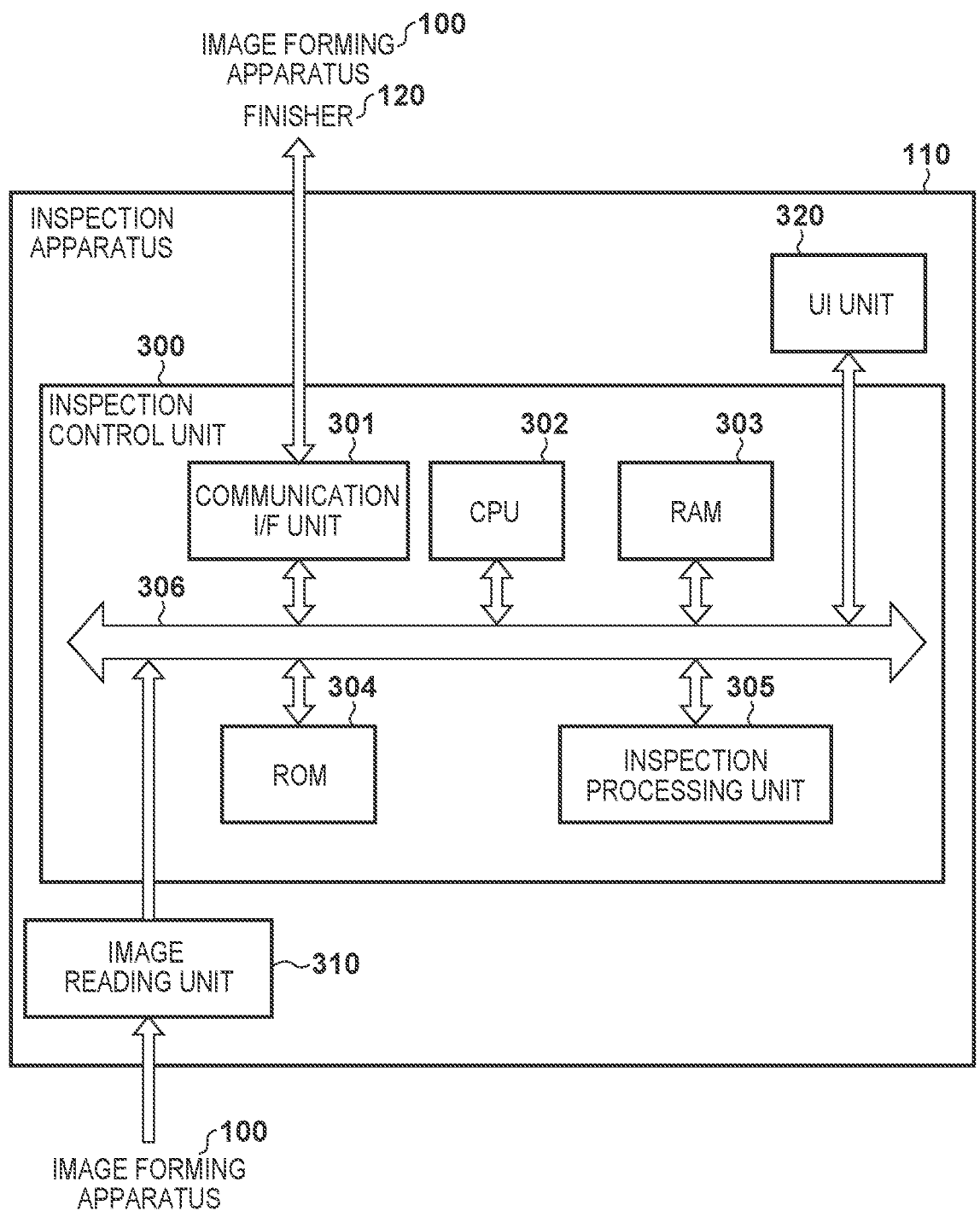
FIG. 3 is a diagram illustrating an internal configuration of an inspection apparatus 110 according to an embodiment.

Next, an example of the configuration of the inspection apparatus 110 according to the present embodiment will be described with reference to FIG. 3. The inspection apparatus 110 includes an inspection control unit 300, the image reading unit 310, and a UI unit 320. The inspection control unit 300 performs control of the entire inspection apparatus 110, performs an inspection of whether or not there is a defect in the printed material, and performs an inspection of a variable region portion, such as a character string or a barcode. The image reading unit 310 reads the printed material transported from the image forming apparatus 100 via a sensor. The UI unit 320 is a display unit the user uses to set a setting for the inspection apparatus 110 and that displays the inspection result to the user. The setting for the inspection apparatus 110 set by the user is an item relating to what kind of defect inspection to perform when inspecting the printed material. The inspection item is a correctness determination for a variable region portion, such as a character string or a barcode, for a circular defect (dot), and for a linear defect (streak).

The inspection control unit 300 includes a communication I/F unit 301, a CPU 302, a RAM 303, a ROM 304, and an inspection processing unit 305. Each component can exchange data with one another via an internal bus 306. The communication I/F unit 301 controls the communication with the image forming apparatus 100 and the finisher 120. The CPU 302 controls the entire inspection apparatus 110. The RAM 303 is a memory used as a working area when the CPU 302 executes various types of commands. The ROM 304 is a memory that stores program data executed by the CPU 302 upon start up, setting data of the inspection control unit 300, and the like. The inspection processing unit 305 inspects whether or not there is a defect in the printed material.

Printed Image Inspection

An overview of the printed image inspection performed by the inspection apparatus 110 will now be given. The inspection apparatus 110, via the image reading unit 310, reads a printed material transported from the image forming apparatus 100 and acquires a scanned image of the inspection target. The acquired scanned image of the inspection target is stored in the RAM 303. Next, the inspection apparatus 110 acquires difference values between a reference image stored in the RAM 303 as the correct image in advance and the scanned image of the inspection target using the inspection processing unit 305.

Next, the inspection apparatus 110 performs inspection by comparing the calculated difference values and an inspection threshold for each inspection item (contrast, size, or the like) per pixel. The result of the inspection is stored in the RAM 303 with, for example, information relating to whether or not there is a defect in the printed material, the type (dot or streak) of the detected defect, position information of the defect for display on the UI unit 320, and the like being stored.

Data Inspection

An overview of the data inspection performed by the inspection apparatus 110 will now be given. The inspection apparatus 110, via the image reading unit 310, reads a printed material transported from the image forming apparatus 100 and acquires a scanned image of the inspection target. The acquired scanned image of the inspection target is stored in the RAM 303. Next, the inspection apparatus 110, via the inspection processing unit 305, inspects whether or not a character string or barcode is readable using a preset character font or barcode standard for Optical Character Reading (OCR). Also, a data check inspection can be performed to check whether the result of the read character string or barcode matches the correct data. The result of the inspection is stored in the RAM 303 with, for example, the result of the character string or barcode read from the printed material, the correct data match result, position information of the character string or barcode read for display on the UI unit 320, and the like are stored.

Next, via the CPU 302, the inspection apparatus 110 instructs the UI unit 320 to display the inspection result stored in the RAM 303. By the inspection result being displayed on the UI unit 320, the user can be made aware of the inspection result. Also, when a consecutive number of printed materials have a defect, via the CPU 302, the inspection apparatus 110 transmits the information described above to the image forming apparatus 100 via the communication I/F unit 301.

The information relating to a consecutive output of printed materials with a defect is received by the controller 200 via the communication I/F unit 207. When the controller 200 receives the information described above, the CPU 202 instructs the printer unit 210 to stop printing. When the printer unit 210 is instructed to stop printing, the image forming apparatus 100 stops the printing operation.

Also, using the CPU 302, the inspection apparatus 110 also transmits information to the finisher 120 via the communication I/F unit 301 on the basis of the inspection result stored in the RAM 303. The information transmitted to the finisher 120 is information relating to whether or not there is a defect in the printed material. The finisher 120 uses the received information and discharges a printed material without a defect to the normal discharge tray and a printed material with a defect to a different tray to the normal discharge tray.

Basic Flow

Figure 4:
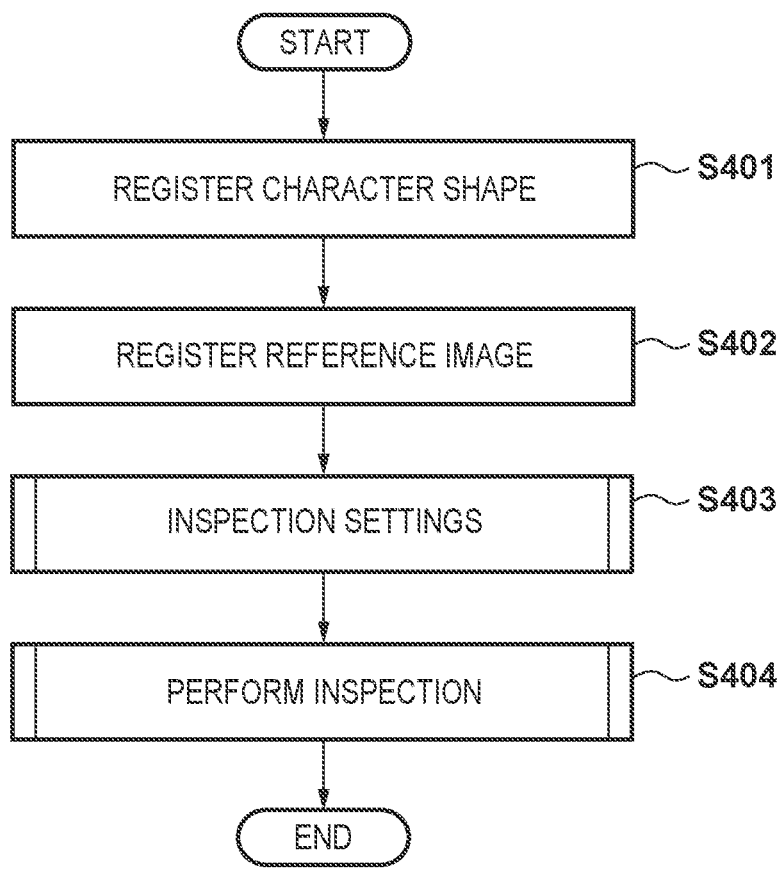
FIG. 4 is a flowchart of the entire inspection processing according to an embodiment.

Next, the basic flow of inspection processing according to the present embodiment will be described with reference to FIG. 4. Here, the flow of the processing from the registration before the start of inspection by the inspection processing unit 305 to the performance of inspection will be described. The processing described below is implemented by the CPU 302 reading out a program stored in the ROM 304 onto the RAM 303 and executing the program, for example. Also, each item of processing is executed by the inspection apparatus 110 according to the user operation from the client PC 130. Note that the data generated during the processing by the inspection apparatus 110 is temporarily stored in the RAM 303 or a non-illustrated storage unit.

First, in step S401, the CPU 302 performs character shape registration by generating the character font. Here, the character shape registered is used in data inspection. The character font is data including character shape images of the characters required by Optical Character Reading (OCR) when performing data inspection and character codes associated together.

The process of generating a character font includes, first, putting the inspection apparatus 110 on standby in a character font image read mode and then receiving a print job for character font generation from the client PC 130. The inspection apparatus 110 receives the character font job from the client PC 130 and reads the character font images. When printing is performed, the inspection apparatus 110 detects the printed material being transported from the image forming apparatus 100, scans the printed material with the image reading unit 310, and stores the scanned image in the RAM 303 of the inspection apparatus 110. From the scanned image, characters for OCR are extracted one character at a time, and the user enters the character code for the extracted character image. In this manner, the character font can be generated. This is the method for generating the character font according to the present embodiment, but no such limitation is intended. Any method may be used as long as the method including generating data in which a character code is associated with each character image extracted from the scanned image. Note that in another embodiment, data inspection may not be performed, and only printed image inspection is performed. In this case, step S402 is transitioned to without step S401 being performed.

Next, in step S402, the CPU 302 registers the reference image corresponding to the correct image for the inspection. The inspection apparatus 110 is put in standby in a reference image read mode, then a print job for reference image registration from the client PC 130 is executed. When printing is performed, the inspection apparatus 110 detects the printed material being transported, scans the printed material with the image reading unit 310, and stores the scanned image as the reference image in the RAM 303 of the inspection apparatus 110.

Next, in step S403, the CPU 302 sets the various inspection parameters, such as inspection region, inspection level, and the like, according to the user inspection settings. Note that step S403 according to the present embodiment will be described below in detail. Next, in step S404, the CPU 302 receives a print job for inspection from the client PC 130, detects a sheet being transported, scans the sheet using the image reading unit 310, and stores the scanned image in the RAM 303 of the inspection apparatus 110. Then, using the inspection parameters set in step S403, inspection is performed on the image of the scanned inspection job and the reference image registered in step S402, ending the processing of the present flowchart. Step S404 according to the present embodiment will be described below in detail.

Inspection Settings

Figure 6:
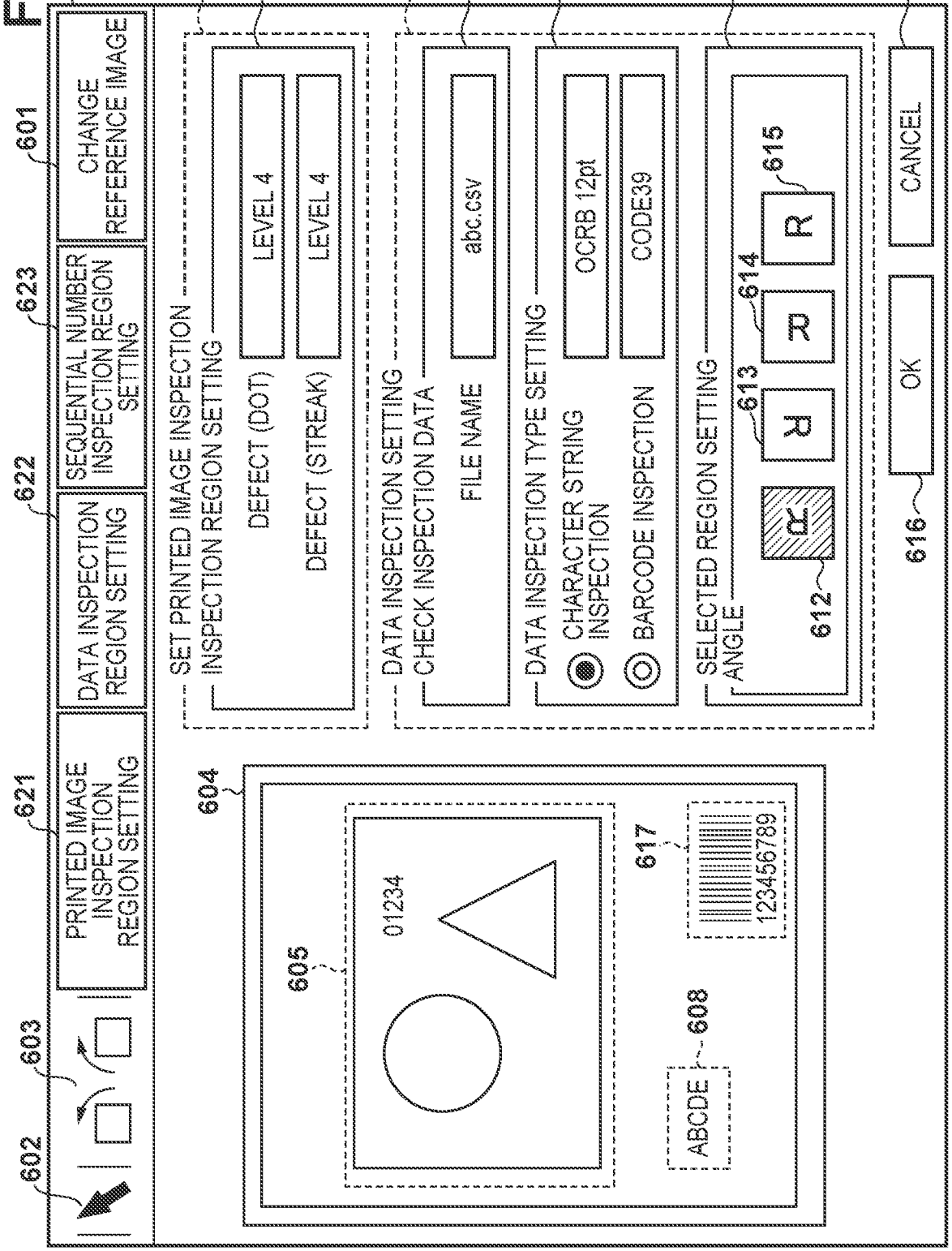
FIG. 6 is a diagram illustrating an example of an UI screen of inspection settings according to an embodiment.

The inspection settings set in step S403 will be described below. First, an example of a UI screen relating to inspection settings will be described with reference to FIG. 6. A UI screen 600 in FIG. 6 is a UI screen displayed on the UI unit 320 of the inspection apparatus 110 when setting settings relating to the inspection in step S403. Note that in the example described here, the display unit of the inspection apparatus 110 is used for display. However, no such limitation is intended, and a display unit of an external apparatus, such as the image forming apparatus 100, the client PC 130, the printing server 140, or the like, may be used for display. In this case, the settings content set via the UI screen (settings screen) is communicated to the inspection apparatus via the network 150 or the like.

A button 601 is a reference image change button used when changing the reference image. A button 602 is an inspection region selection button pressed by the user when the user wishes to change the settings information of the region already set. For example, by selecting the button 602, a cursor is displayed as illustrated at the button 602, and a predetermined region on a page preview 604 can be selected by operating the cursor. The page preview 604 is a display region displaying the reference image read in step S402.

A button 603 is a button for rotating the image displayed in the page preview 604. A button 616 is a button for ending all of the inspection settings and performing inspection. A button 619 is a button for suspending the inspection settings. When the user presses the button 619, the information currently set is discarded and the inspection settings ends.

A button 621 is a button pressed by the user when setting the printed image inspection region. A button 622 is a button pressed by the user when setting the data inspection region. A button 623 is a button pressed by the user when setting the sequential number inspection region. By selecting a discretionary region of the page preview 604 with any one of the buttons 621, 622, or 623 pressed, the region corresponding to the selected button can be set. Regarding selection, the cursor may be displayed with the button 602 pressed, and the cursor may be moved to a desired region to select it. In this manner, according to the present embodiment, the type (printed image inspection, data inspection, sequential number inspection, and the like) of inspection settings can be set individually per predetermined region.

A UI 606 is a UI group for setting the detection level of the defect when performing printed image inspection. The UI 606 will be described in detail below. A UI 609 is a UI group for setting the data file referenced when checking the detected data when performing data inspection and setting the type of data inspection and other detailed information. The UI 609 will be described in detail below.

Processing Process

Next, the detailed processing process of the inspection settings in step S403 will be described with reference to FIG. 5. The processing described below is implemented by the CPU 302 reading out a program stored in the ROM 304 onto the RAM 303 and executing the program, for example. By executing the processing of the flowchart, the inspection apparatus 110 sets the various types of inspection parameters, such as inspection level, inspection level, and the like, relating to the printed image inspection and the data inspection according to the user inspection settings.

First, in step S501, the CPU 302 changes the reference image registered in step S402. For example, when there is a defect in the design portion of the reference image registered in step S402, correct inspection cannot be performed. In such a case, the user can change the reference image in step S501. The inspection apparatus 110 is put in standby in a reference image read mode, then a print job for reference image registration is executed using the client PC 130. When printing is performed, the inspection apparatus 110 detects the printed material being transported, scans the printed material with the image reading unit 310, and stores the scanned image as the reference image in the RAM 303 of the inspection apparatus 110. Then, the inspection apparatus 110 changes the image displayed in the page preview 604 with the scanned image. Note that the processing of step S501 is executed when the user presses the button 601.

Next, in step S502, the CPU 302 selects the inspection method. In the present embodiment described herein, there are three inspection methods, printed image inspection, data inspection, and sequential number inspection. Naturally, other inspection methods may be included. The user selects the inspection method by selecting one of the buttons 621, 622, or 623 in the UI screen 600.

Next, in step S503, the CPU 302 determines whether printed image inspection has been selected in step S502. When the user has selected the button 621 in the UI screen 600, the CPU 302 determines that printed image inspection has been selected. When printed image inspection has been selected, the processing proceeds to step S504. Otherwise, the processing proceeds to step S506.

In step S504, the CPU 302 sets the printed image inspection region. The method for setting the printed image inspection region according to the present embodiment is as follows. First, after the printed image inspection region setting of the button 621 is selected via a user operation, the user uses the button 602 or the like to specify the area in the page preview 604 they wish printed image inspection to be performed. In response to this operation, the inspection apparatus 110 sets the corresponding specified area as a printed image inspection region 605. Note that the printed image inspection region is an inspection region for detecting defects in the design portion of the printed material.

Then, in step S505, the CPU 302 sets the detect item in a UI 607 for detecting a defect in printed image inspection and the detection level. The detect item for printed image inspection is an item relating to a defect feature to be detected when the printed material is inspected and is, for example, a circular defect (dot) or a linear defect (streak). The detection level is a parameter with different levels set for how large a defect has to be to be determined as a defect for each detected defect feature. For example, five levels, level 1 to level 5, are used, with level 5, compared to level 1, allowing defects that are lighter and smaller to be detected. Also, the inspection item can be set to different levels, such as the dot being set to inspection level 5 and the streak being set to inspection level 4. In the UI 607 in FIG. 6, the user has selected level 4 for the inspection level setting for defects (dot) and level 4 for the inspection level setting for defects (streak).

When it is determined that the printed image inspection is not selected, in step S506, the CPU 302 determines whether data inspection has been selected in step S502. When the user has selected the button 622 in the UI screen 600, it is determined that data inspection has been selected. When data inspection has been selected, the processing proceeds to step S507. Otherwise, the processing proceeds to step S510.

When it is determined that the data inspection is selected, in step S507, the CPU 302 sets the data inspection region. The method for setting the data inspection region according to the present embodiment is as follows. First, the data inspection region setting of the button 622 is selected via a user operation. Thereafter, the button 602 or the like is used to specify the area in the page preview 604 they wish data inspection to be performed. Accordingly, the inspection apparatus 110 sets the specified area to a data inspection region 608 for character string inspection and a data inspection region 617 for barcode inspection. Note that the data inspection region is an inspection region for determining correctness via reading the type (character string or barcode) of the set data.

Next, in step S508, via a file selection method, the CPU 302 sets the check inspection data file in the UI 610 to be used as the correct character information when performing correctness determination for data inspection. The check inspection data according to the present embodiment is a reference CSV file for data inspection checked when performing data inspection. The reference CSV file is a file that is prepared in advance on the user side and includes a list of the correct character strings for the character string inspection and the barcode inspection. The result of reading the character string inspection region and the barcode when data inspection is performed is checked against the correct character string listed in the reference CSV file. In the UI 610, as the check inspection data, data with a file name of abc.csv is selected.

Next, in step S509, the CPU 302 sets the type of character string inspection or barcode inspection selected by the user via a drop-down list of settings for the type of data inspection in a UI 620. The type of character string according to the present embodiment is the character font registered for the character shape in step S401. In the UI 620, 'OCRB 12 pt' is selected as the selected character font of the character string inspection. Also, the type of barcode according to the present embodiment is the barcode standard supported in the data inspection. For example, if one-dimensional barcodes, such as CODE39 and JAN, and two-dimensional barcodes, such as QR code (registered trademark) and DataMatrix code, are standards that are supported in the data inspection, they can be selected in a UI 720. In the UI 620, 'CODE39' is selected as the selected barcode inspection. The inspection apparatus 110 according to the present embodiment sets the data inspection type to 'OCRB 12 pt' due to the data inspection region 608 being a character string and sets the barcode inspection 'CODE39' due to the data inspection region 617 being a barcode.

When it is determined that data inspection is not selected in step S506, in step S510, the CPU 302 determines whether sequential number inspection has been selected in step S502. When the user has pressed the button 623 in the UI screen 600, it is determined that sequential number inspection has been selected. When sequential number inspection has been selected, the processing proceeds to step S511. Otherwise, the processing returns to step S502. The sequential number inspection is an inspection in which reference data is automatically generated without using the reference CSV file from the data inspection described above. Sequential number inspection is performed when the inspection target is a numerical data region and the numerical data increases or decreases according to a certain rule within a page or across pages.

Figure 8:
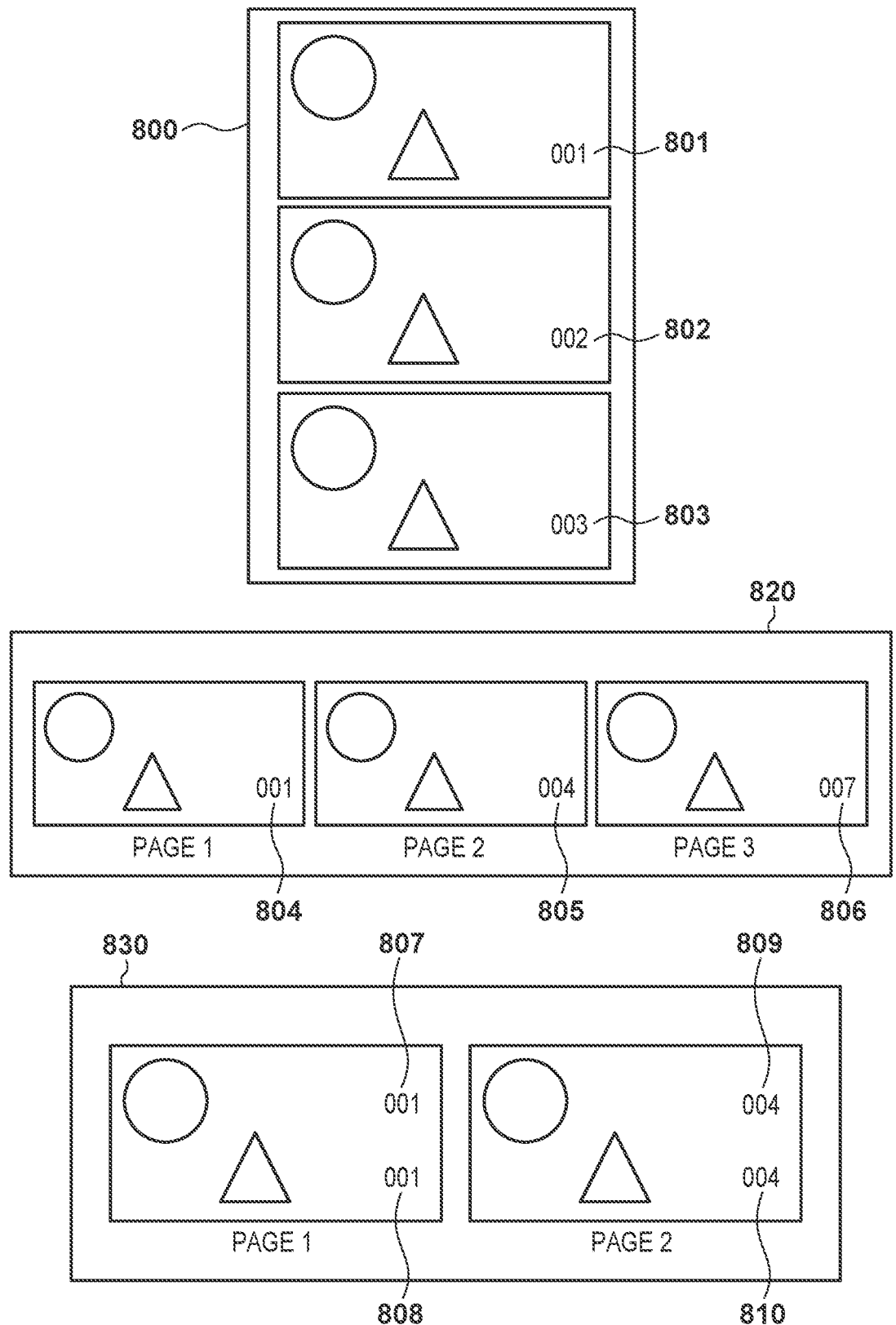
FIG. 8 is a diagram illustrating an example of image configurations corresponding to sequential number inspection targets according to an embodiment.

FIG. 8 illustrates an example of numerical data. In this example, numerical data regions 801 to 803 of 800 include, within one page, a numerical value that increases by one and thus are regions that can be subjected to sequential number inspection. Also, numerical data regions 804 to 806 of 820 include a numerical value that increases by 3 across each page and thus are regions on each page that can be subjected to sequential number inspection. When sequential number inspection is selected and the numerical data regions 801 to 803 and the numerical data regions 804 to 806 are set as inspection target regions, in the present embodiment, reference data is automatically generated and inspection is performed on the basis of the setting value inputted in the UI for sequential number inspection settings described below.

When it is determined that sequential number inspection is selected in step S510, in step S511, the CPU 302 functions as a display control unit and displays the UI for sequential number inspection settings on the display unit. An example of the UI for sequential number settings according to the present embodiment will now be described using FIG. 7. The setting content set via the UI for sequential number inspection includes content from which data defined by a predetermined rule can be derived. In other words, when the type of check inspection is sequential number inspection, the starting number of the sequential numbers, the increase or decrease value, the number of digits, and the like are included are setting content.

Figure 7:
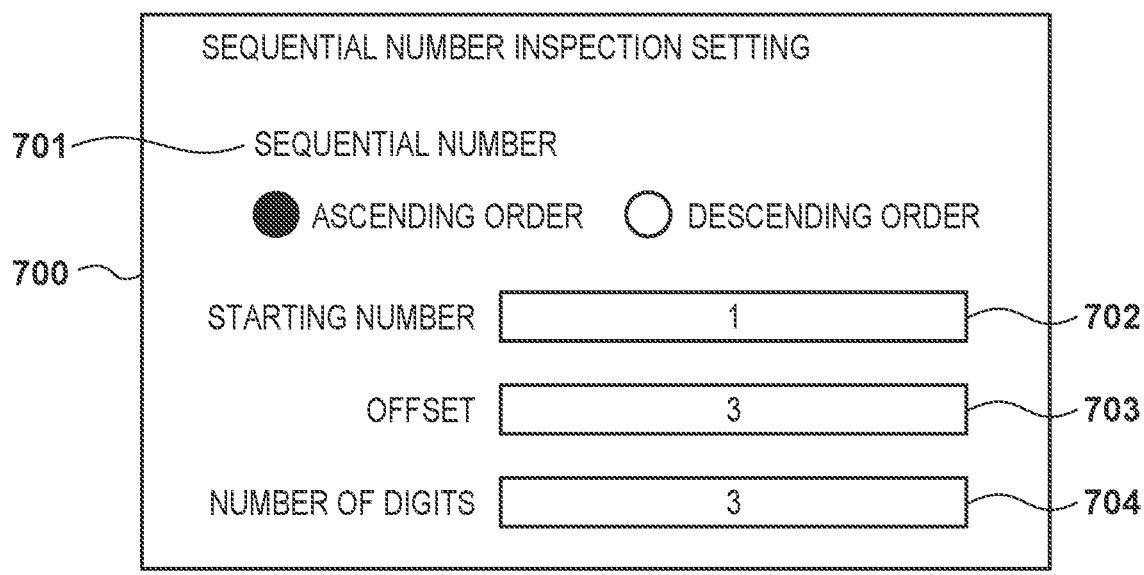
FIG. 7 is a diagram illustrating an example of an UI screen of sequential number inspection settings according to an embodiment.

A UI screen 700 in FIG. 7 is a UI screen displayed on the UI unit 320 of the inspection apparatus 110 when setting sequential number inspection settings. A UI 702 is a region for setting the sequential number starting number. For example, when the numerical data region 804 indicated in 820 of FIG. 8 is selected as the sequential number inspection target region, the starting number is '1'. The UI 702 shows the number '1' set as the starting number in this example.

A UI 703 is a region for setting the increase or decrease value for the numerical value across pages of a sequential number inspection target region. In the present embodiment, the increase or decrease value described above is referred to as an offset. For example, the numerical data regions 804 to 806 of 820 in FIG. 8 include a numerical value that increases by 3 each page, and thus the offset is '3'. The UI 703 shows the number '3' for the offset in this example. Also, when a minus number is specified for the offset, the value decreases from the starting number.

Figure 16:
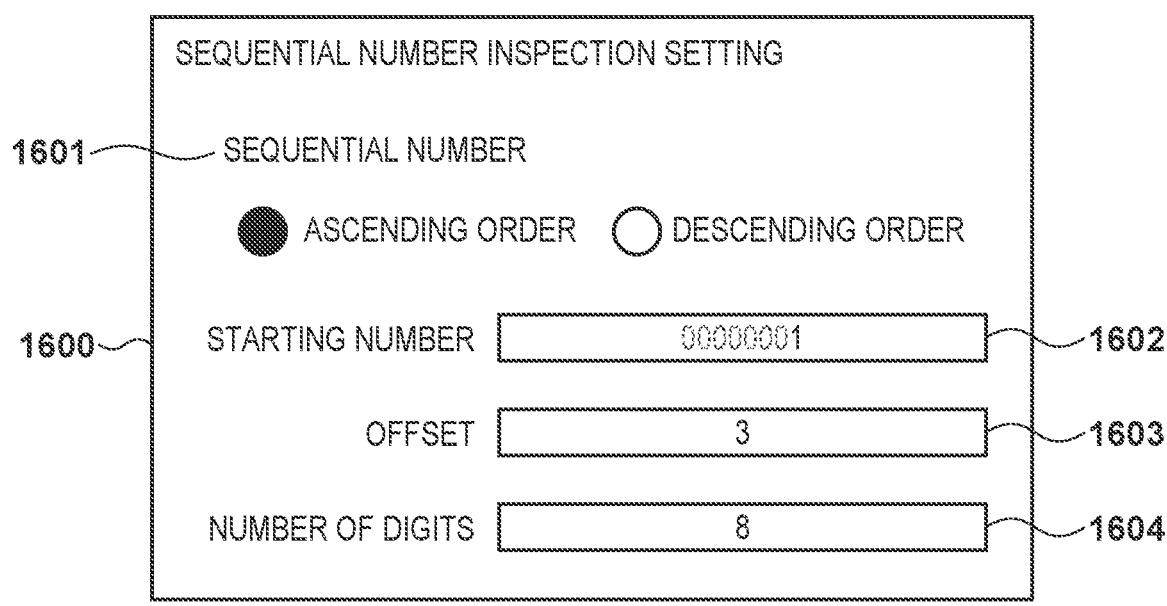
FIG. 16 is a diagram illustrating an example of an UI screen of sequential number inspection settings according to an embodiment.

A UI 704 is a region for setting the number of digits for the numerical value of a sequential number inspection target region. In the sequential number inspection target region, as with the data inspection region, a value in the inspection target region is extracted from the inspection target image through the OCR, as the numerical value. By setting the number of digits in the UI 704, of the extracted numerical value, how many digits are taken as the inspection target can be set. For example, the numerical data regions 804 to 806 of 820 in FIG. 8 are three-digit numerical values, and thus the number of digits is '3'. Also, the number of digits does not need to be set to the number of digits of the numerical value in the inspection target region. For example, even when the numerical value in the inspection target region has 5 digits, but of these, only a portion, for example only 3 digits, are wished to be inspected, the UI 704 can be set to '3'. The UI 704 shows '3' for the number of digits in this example. When the number of digits is large, it may be difficult to know what number of what digit of the starting number is inputted. Accordingly, as illustrated in a UI 1602 in FIG. 16, the input number of digits may be displayed as light gray zeros in a UI 1604, for example. In other words, of the number of digits of the inspection target, the number of digits other than the set portion of digits described above are displayed grayed out. Note that regarding the display of UI 1602, any representation method may be used as long as what digit for the starting number is being input, corresponding to the number of digits inputted in the UI 1604, can be represented. A UI 701 is a region for selecting whether the numerical values of the sequential numbers increase or decrease. Ascending order indicates increase, and descending order indicates decrease. Also, instead of displaying the UI 701, a plus or minus sign may be assigned to the input of the starting number in the UI 702, representing whether the numerical values of the sequential numbers increase or decrease.

Figure 5:
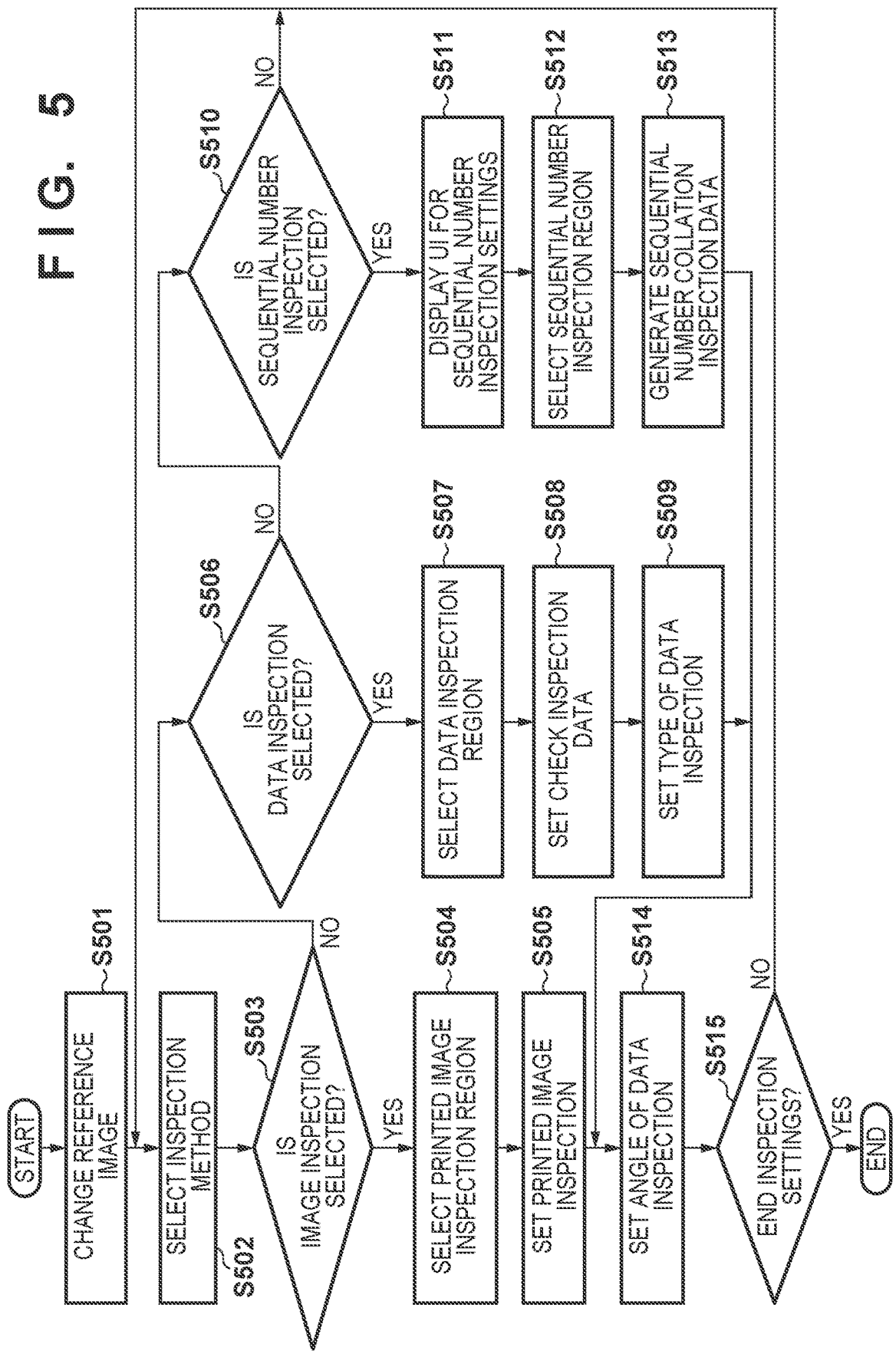
FIG. 5 is a flowchart of detailed settings in an inspection method according to an embodiment.

Now we will return to the description of FIG. 5. Next, in step S512, the CPU 302 sets the sequential number inspection region. Setting the sequential number inspection region according to the present embodiment is similar to selecting the region in step S507 in data inspection and includes the area the user wishes to perform sequential number inspection on being specified in the page preview 604 by a user operation. Also, in sequential number inspection, a specified region may be copied. For example, as with numerical data regions 807 and 808 of 830 in FIG. 8, there may be a plurality of regions in one page with the same value in the regions. In this case, inspection can be performed using one piece of reference data. For example, after the numerical data region 807 is set in region setting, when setting the region for the numerical data region 808, the region setting may be copied so that the same inspection settings as that of the numerical data region 807 are used, and the same reference data to be referenced upon inspection may also be used. A discretionary method can be used for the copy operation method. For example, a non-illustrated settings copy button may be provided, and after the numerical data region 807 with completed sequential number inspection settings and the numerical data region 808 with uncompleted settings are selected, the settings of the numerical data region 807 are copied to the numerical data region 808 when the settings copy button is selected.

Next, in step S513, on the basis of the setting content and the inspection target number of pages inputted into the UI for the sequential number inspection settings displayed in step S511, the CPU 302 generates a plurality of pages of reference data for the region selected in step S512. In the present embodiment, in the reference data, the sequential number inspection target region is assigned with an ID, and the reference data is stored in the RAM 303 of the inspection apparatus 110 as sequential number data associated with the assigned ID. For example, let's assume that the numerical data regions 804 to 806 of 820 in FIG. 8 are the sequential number inspection targets and the reference data is generated on the basis of the settings of the UI screen 700 in FIG. 7. In this case, the sequential number inspection target region is assigned ID1, and the data 'ID1, 001, 004, 007' is stored in the RAM 303 of the inspection apparatus 110. When inspection is performed, this reference data stored in the RAM 303 of the inspection apparatus 110 is referenced and compared to the value extracted from the inspection target image.

After the processing of step S505, step S509, or step S513, the process proceeds to step S514. In step S514, the CPU 302 sets the read direction for the character string or barcode when data inspection or sequential number inspection is performed using any one of the buttons 612 to 615 in a UI 611. The direction setting buttons 612 to 615 are buttons corresponding to 0°, 90°, 180°, and 270°, directions 90 degrees going around in the clockwise direction from the conveyance direction of the sheet. The conveyance direction of the sheet is the left direction as seen from the page preview 604 in FIG. 6, and thus the angle setting corresponding to the direction setting button 612 is 0°. The direction setting buttons 612 to 615 are set to match the angle at which the character string or barcode displayed in the page preview 604 is displayed. Note that the direction setting buttons 612 to 615 are used to set the direction for reading the character string or barcode in the present embodiment. However, no such limitation is intended, and a UI (for example, a radio button or the like) that can set the direction may be used.

Finally, in step S515, the CPU 302 determines whether to end the inspection settings. In the present embodiment, whether to end the inspection settings is determined by whether or not the user has started the inspection. As described above, the inspection is started when the button 616 in the UI screen 600 is selected. Thus, when the user selects the button 616, end inspection settings is determined. When end inspection settings are determined in step S515, the inspection settings ends. When do not end inspection settings are determined, the processing returns to step S502.

The processing described above relates to detailed settings including the inspection level, the inspection type, and the inspection region for printed image inspection, data inspection, and sequential number inspection. Note that according to the present embodiment, the processing of the flowchart in FIG. 5 determines which inspection is selected in order from image inspection, data inspection, and sequential number inspection. However, the order for determining the inspections is not limited thereto and may be a discretionary order.

Performing Inspection

Next, the detailed processing process of performing inspection in step S404 will be described with reference to FIG. 9. The processing described below is implemented by the CPU 302 reading out a program stored in the ROM 304 onto the RAM 303 and executing the program, for example. When a non-illustrated inspection start button displayed on the UI unit 320 is operated by the user, the inspection apparatus 110 performs inspection using the inspection processing unit 305.

First, in step S901, the inspection processing unit 305 detects defects (dot) and defect (streak) included on the sheet as printing defects using the inspection settings set by the user in step S403. The method for detecting defects that occur during printing according to the present embodiment includes extracting the difference between the reference image registered in step S402 and the scanned image of the corresponding print job and detecting defects (dot) and defects (streak) from the features of the extracted difference image. However, the present embodiment is not limited thereto, and a known method may be used as the method for detecting defects that occur during printing.

Next, in step S902, the inspection processing unit 305 performs OCR or barcode recognition of the data inspection region including the sequential number inspection region using the inspection settings set by the user in step S403. The OCR according to the present embodiment is performed as follows. First, the target region corresponding to the OCR is divided at each character. Then, using the character font registered in step S401, the similarities between the character shape images registered in the character font and the divided characters are calculated, and the character code corresponding to the character shape image with the highest similarity is set as the result for one character. Then, a character string obtained by merging all of the results of the divided characters is set as the OCR result. However, the present embodiment is not limited thereto, and any known method may be used that uses OCR with a character font.

Next, in step S903, the inspection processing unit 305 checks the character recognition result and the barcode recognition result obtained in step S902 against the correct character string listed in the check inspection file set in step S508 or the reference data generated in step S513. Then, the correctness determination result is outputted as the inspection result. Thereafter, in step S904, the inspection processing unit 305 functions as a result output unit and transmits the inspection result obtained in step S903 to the UI unit 320. When the inspection result is received, the UI unit 320 displays the scanned image of the inspection target and the inspection result to the user. When there is a defect in the printed material, the UI unit 320 accentuates the detected defect on the scanned image with a broken line frame, colored frame, or the like and displays this with the type (dot or streak), the position information, and the like of the detected defect. On the other hand, when there is no defect in the printed material, a character string indicating that there is no defect is displayed. Note that the method for displaying the inspection result using the UI unit 320 is not limited thereto, and it is sufficient that the inspection result is displayed to the user in an easy-to-understand manner.

The inspection processing unit 305 also transmits the inspection result obtained in step S903 to the image forming apparatus 100 and the finisher 120. The information transmitted to the image forming apparatus 100 is information indicating that a defect has occurred in printed materials consecutively for a certain number, and the information transmitted to the finisher 120 is information relating to whether or not there is a defect in the printed material. As described above, when the information described above is received, the image forming apparatus 100 stops the printing operation. Also, the finisher 120 uses the received information and discharges a normal printed material without a defect to the normal discharge tray and a printed material with a defect to a different tray to the normal discharge tray. Note that the inspection result may be transmitted to another external apparatus via the network 150. This ends the description relating to the operation of the inspection apparatus 110 after the inspection settings in step S404.

As described above, the inspection apparatus according to the present embodiment includes a scanner that reads a printed material. Also, the inspection apparatus according to the present embodiment sets the settings relating to the check inspection data for checking the data formed on the printed material, derives the data defined by a predetermined rule according to the setting content, and generates the check inspection data for a plurality of sections in the printed material. Also, the inspection apparatus according to the present embodiment detects a defect in the inspection target printed material by comparing the data read from the inspection target printed material and the corresponding generated check inspection data. In this manner, when the inspection target is data defined by a predetermined rule, reference data spanning across a plurality of sections (for example, a plurality of sections in one page or a section in a plurality of pages) in the printed material can be automatically generated from the setting content. Accordingly, compared to manually generating the reference data, the effort can be reduced. Also, mistakes when manually generating correct data can be reduced.

Second Embodiment

The second embodiment of the present invention will be described below. In the first embodiment described above, the ascending order/descending order, the starting number, the offset, and the number of digits of the sequential numbers are set when performing a sequential number inspection. Accordingly, when the numerical values increase within one page of the inspection target image or across pages at an interval of a certain value, the reference data can be automatically generated and inspection can be performed. However, when the value changes every two pages as in numerical data regions 1101 to 1104 in FIG. 11, for example, the reference data cannot be automatically generated. Specifically, in the numerical data regions 1101 and 1102 on page 1 and 2, the number '001' is written, and in the numerical data regions 1103 and 1104 on the subsequent pages 3 and 4, the number '004' is printed. In other words, it is set so that every two pages, the sequential number increases by '3'. In the present embodiment, the reference data can be automatically generated and inspection can be performed even when there are sequential numbers that increase in value every couple of pages in an inspection target image in this manner.

The basic processing is the same as in the first embodiment described above, and similar control and configurations will be omitted from the description. In the present embodiment, similar to the second embodiment, as in the first embodiment described above, as the UI displayed in step S511 in FIG. 5, a region for setting an interval 1004 is displayed in addition to an ascending order and descending order 1001, a starting number 1002, an offset 1003, and a number of digits 1005 as illustrated in FIG. 10. The interval 1004 is for setting how many pages between when the value increases or decreases by the offset amount. For example, when the UI is set as in the UIs 1001 to 1005 in FIG. 10 and the interval is set to '2', the value increases by the offset amount of '3' every two pages as indicated by 1101 to 1104 in FIG. 11.

As described above, the inspection apparatus according to the present embodiment includes an image reading unit that reads a printed material. Also, the inspection apparatus according to the present embodiment sets the settings relating to the check inspection data for checking the data formed on the printed material, derives the data defined by a predetermined rule according to the setting content, and generates the check inspection data for a plurality of sections in the printed material. Also, the inspection apparatus according to the present embodiment detects a defect in the inspection target printed material by comparing the data read by the image reading unit from the inspection target printed material and the corresponding generated check inspection data. In this manner, according to the present embodiment, when the sequential numbers increase or decrease in value every couple of pages in the inspection target image, or in other words when data defined by a predetermined rule is the inspection target, the reference data can be automatically generated and the inspection can be performed.

Third Embodiment

Figure 13:
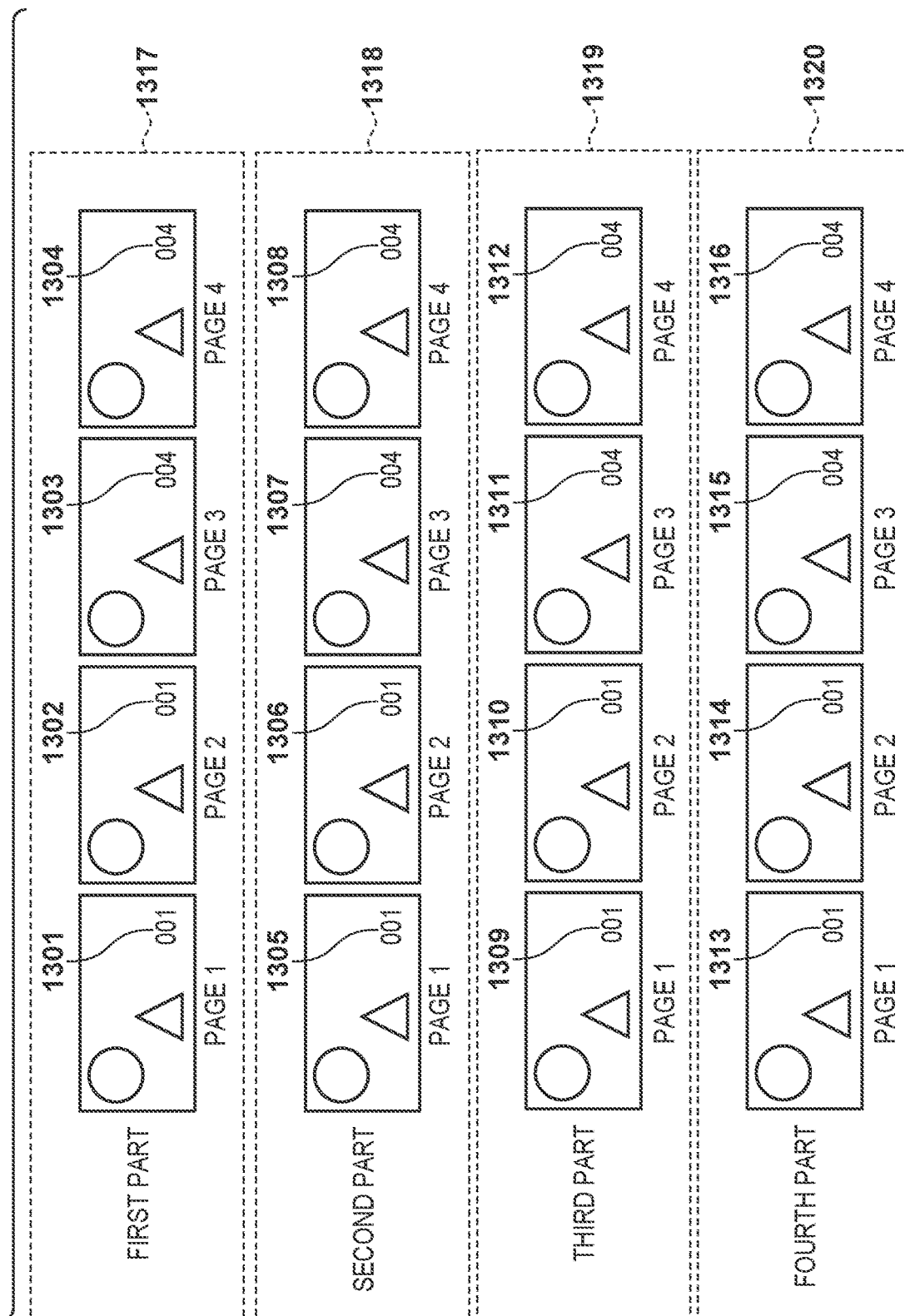
FIG. 13 is a diagram illustrating an example of image configurations corresponding to sequential number inspection targets according to an embodiment.

The third embodiment of the present invention will be described below. In the second embodiment described above, the interval is set when performing a sequential number inspection in addition to the ascending order/descending order, the starting number, the offset, and the number of digits of the sequential numbers. Accordingly, the reference data can be automatically generated and inspection can be performed even when there are sequential numbers that increase in value every couple of pages in an inspection target image in this manner. However, for example, for an image printed in a plurality of parts in which the same sequential numbers are repeated for each part, reference data cannot be automatically generated. FIG. 13 illustrates an example of sequential numbers printed in parts. When printed in a plurality of parts, the same sequential numbers are repeated as with numerical data regions 1301 to 1304 of the first part and the following repeated parts numerical data regions 1305 to 1308, 1309 to 1312, and 1313 to 1316. Specifically, in the numerical data region 1301 to 1304 on pages 1 to 4 of a first part 1317 of the printed parts, the numbers '001', '001', '004', and '004' are printed. In the numerical data region 1305 to 1308 on pages 1 to 4 of a second part, the numbers '001', '001', '004', and '004' are also printed. This is the same for the third and the fourth part. In other words, the same sequential numbers are set for the first part and the second, third, and fourth part. In the present embodiment, the reference data can be automatically generated and inspection can be performed even when the same sequential numbers are repeated in an inspection target image.

Figure 12:
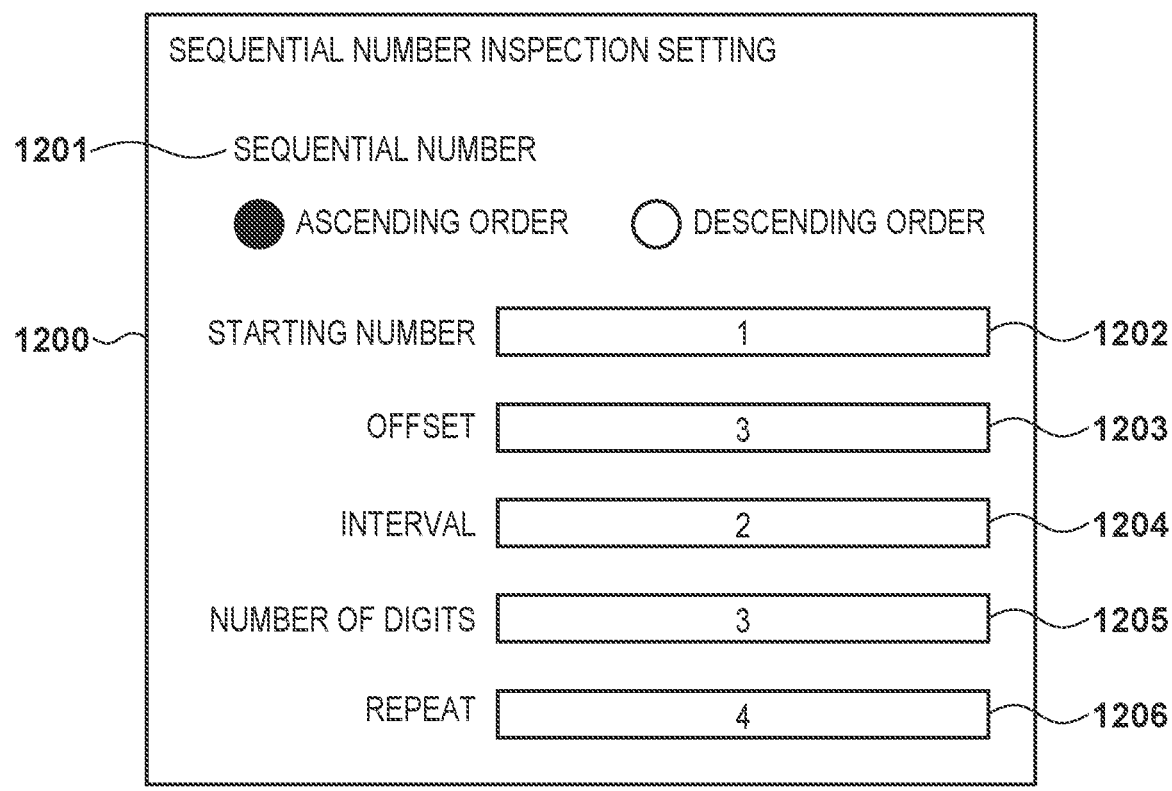
FIG. 12 is a diagram illustrating an example of an UI screen of sequential number inspection settings according to an embodiment.

The basic processing is the same as in the second embodiment described above, and similar control and configurations will be omitted from the description. In the present embodiment, as in FIG. 12, as the UI displayed in step S511 in FIG. 5, a region for setting a repeat 1206 is displayed in addition to an ascending order and descending order 1201, a starting number 1202, an offset 1203, an interval 1204, and a number of digits 1205. The repeat 1206 is for setting how many times to repeat the sequential number generated using the settings of the ascending order and descending order 1201, the starting number 1202, the offset 1203, the interval 1004, and the number of digits 1205. For example, when the settings of UI 1201 to 1206 in FIG. 12 are used and repeat is set to '4', the sequential numbers 1301 to 1304 in FIG. 13 are also set as the sequential numbers 1305 to 1308, 1309 to 1312, and 1313 to 1316, and the sequential numbers are repeated four times.

As described above, with the inspection apparatus according to the present embodiment, in addition to the configuration of the embodiment described above, at the settings screen, as the inspection settings for the values of the sequential numbers, the number of times the sequential numbers are repeated can also be set. In this manner, according to the present embodiment, when the sequential numbers that increase or decrease in value every couple of pages are repeated in the inspection target image, or in other words when data defined by a predetermined rule is the inspection target, the reference data can be automatically generated and the inspection can be performed.

Fourth Embodiment

The fourth embodiment of the present invention will be described below. Performing inspection according to the first embodiment described above involves the input inspection target image being the target of all of the inspections. However, in some cases, the input inspection target image may be wished to be excluded from being the inspection target. Such cases include when an image includes a blank inspection region or when the entire image is blank, that is when a blank sheet becomes mixed in with an inspection target image group, or when a blank sheet is intentionally inserted in an inspection target image group as an interleaved sheet. In the present embodiment, when the set inspection region is blank, the inspection target image can be switched to be excluded from the inspection target.

Figure 14:
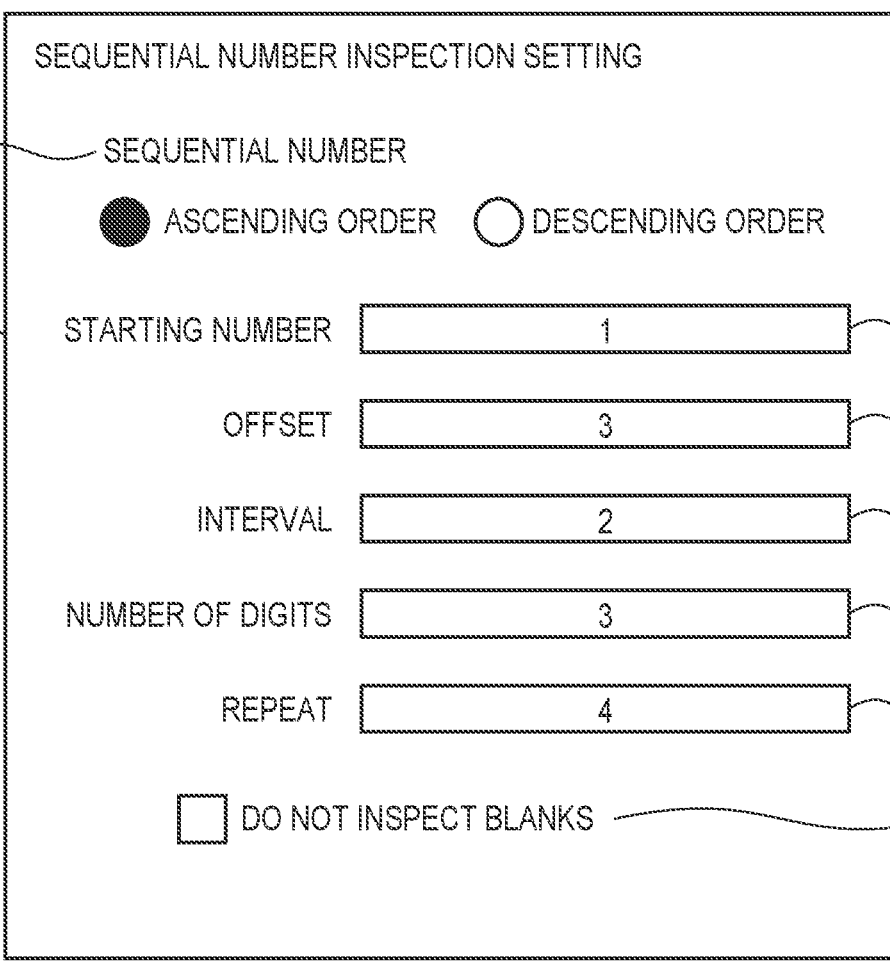
FIG. 14 is a diagram illustrating an example of an UI screen of sequential number inspection settings according to an embodiment.

The basic processing is the same as in the third embodiment described above, and similar control and configurations will be omitted from the description. FIG. 14 illustrates an example of a settings screen according to the present embodiment. The settings screen is an example of the UI displayed in step S511 in FIG. 5. As illustrated in FIG. 14, a region for setting do not inspect blanks 1407 is displayed in addition to an ascending order and descending order 1401, a starting number 1402, an offset 1403, an interval 1404, a number of digits 1405, and a repeat 1406. The do not inspect blanks 1407 is displayed in the form of a checkbox, for example, and switches the processing depending on whether it is checked or not. When the do not inspect blanks 1407 is not checked, the operation is the same as that in the third embodiment described above. When the do not inspect blanks 1407 is checked, images with a blank target region are excluded from being the inspection target.

Figure 15:
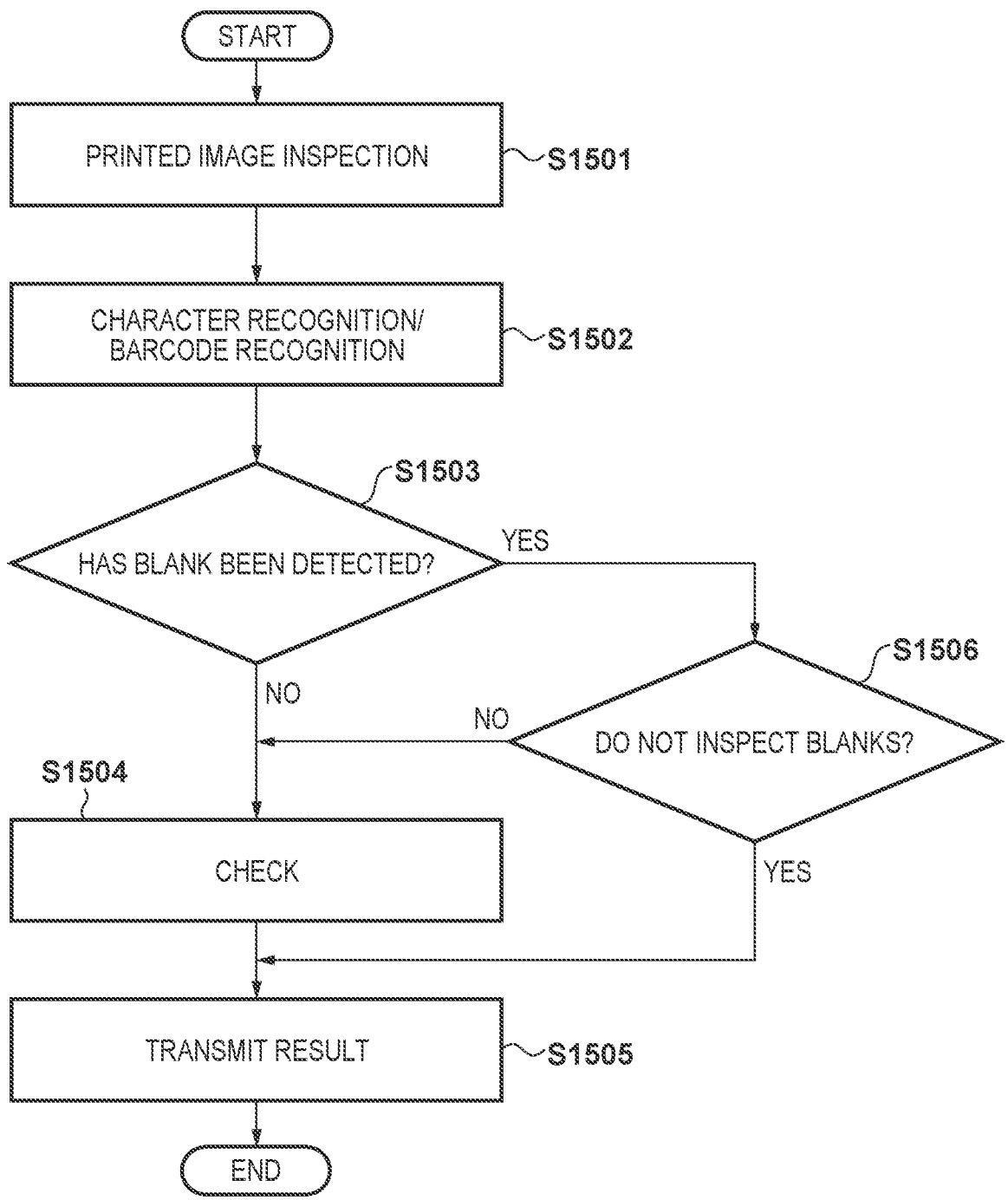
FIG. 15 is a flowchart for performing an inspection according to an embodiment.

The detailed processing process of performing inspection in step S404 according to the present embodiment will now be described with reference to FIG. 15. The processing described below is implemented by the CPU 302 reading out a program stored in the ROM 304 onto the RAM 303 and executing the program, for example. When a non-illustrated inspection start button displayed on the UI unit 320 is operated by the user, the inspection apparatus 110 performs inspection using the inspection processing unit 305.

Steps S1501 and S1502 are the same as in FIG. 9 and are thus omitted from this description. Next, in step S1503, the inspection processing unit 305 detects whether the inspection region of the inspection target image is blank. For example, no characters being detected in the inspection region results in a blank being detected. Also, a blank may be detected when nothing, in terms of not just characters but also objects such as graphics, is detected. Also, instead of the target region of the blank detection being the inspection region, the entire image may be detected for a blank. The conditions for determining a blank may be able to be set. In the present embodiment, when a blank is detected, a blank flag is assigned to the inspection target image, making the inspection target image able to be identified as being blank in the following processing. Note that as long as the inspection target image can be indicated to be blank, any method may be used.

In step S1503, when a blank is detected, the processing proceeds to step S1506, and the inspection processing unit 305 determines whether or not to inspect a blank. In the present embodiment, for example, this is determined by whether or not the user has checked the checkbox for the do not inspect blanks 1407 in FIG. 14. When the checkbox of the do not inspect blanks 1407 is not checked, the operations of steps S1504 and S1505 are performed. These are as described using FIG. 9 and are thus omitted from the description.

When the checkbox of the do not inspect blanks 1407 is checked, the checking in step S1504 is not performed, and the result transmission of step S1505 is performed. For the inspection target image detected as a blank, the output of the inspection result may be skipped or this may be always outputted as a correct or incorrect determination. Note that here, determining whether or not to inspect blanks is performed on the basis of whether or not the checkbox is checked. However, any method can be used as long as whether or not blanks are inspected can be switched on the basis of a user instruction.

As described above, the inspection apparatus according to the present embodiment includes an image reading unit that reads a printed material. Also, the inspection apparatus according to the present embodiment sets the settings relating to the check inspection data for checking the data formed on the printed material, derives the data defined by a predetermined rule according to the setting content, and generates the check inspection data for a plurality of sections in the printed material. Also, when the set inspection region is blank, the inspection target image can be switched to be excluded from the inspection target. Also, the inspection apparatus according to the present embodiment detects a defect in the inspection target printed material by comparing the data read by the image reading unit from the inspection target printed material and the corresponding generated check inspection data. In this manner, according to the present embodiment, when the set inspection region is blank, the inspection target image can be switched to be excluded from the inspection target, and inspection can be performed excluding the blank inspection target image.

Modified Examples

The present invention is not limited to the embodiments described above and can include various modifications. For example, in the embodiments described above, the numerical values of sequential numbers are used as data defined by a predetermined rule. However, no such limitation is intended, and other examples of data defined by a predetermined rule may be used. Other examples of data defined by a predetermined rule are numerical values derived from a predetermined function, date and time information, and the like. Numerical values derived from a predetermined function include not only the addition or subtraction of predetermined values as described in the embodiments but also includes numerical values derived using more complex functions (computational formulas). Thus, in this case, instead of the starting number, an initial value is preferably set and how the values increase or decrease from the initial value is preferably able to be set. Also, date and time information includes information of a data and/or time, and how the values increase or decrease daily from the starting date and time is preferably able to be set. Note that instead of date and time information, day of the week information may be included. For example, in the case of a printed material printed with the date for a ticket for an event held every Saturday, check inspection data including the date of every Saturday is generated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-069023, filed Apr. 19, 2022, and No. 2022-143935, filed Sep. 9, 2022, which are hereby incorporated by reference herein in their entirety.

What is claimed is:

1. An inspection apparatus comprising:
one or more memory devices that store instructions; and
one or more processors that execute the instructions to:
obtain target data from a scanner reading an inspection target printed material;
set a sequential number inspection, including setting a starting number, an ascending or descending order, and an offset indicating an increase or decrease in a numerical value of the sequential number inspection for an inspecting number formed on the inspection target printed material;
generate reference data in accordance with the set starting number, the set ascending or descending order, and the set offset; and
detect a defect in the inspection target printed material by comparing the obtained target data and the generated reference data.

2. The inspection apparatus according to claim 1, wherein:
the one or more processors execute the instructions to display a settings screen on a display unit of the inspection apparatus or an external apparatus, and a predetermined region in an image of the inspection target printed material is settable via the setting screen as an inspection region.

3. The inspection apparatus according to claim 2, wherein data defined by a predetermined rule included in the inspection region corresponds to numerical values of sequential numbers increasing or decreasing across a plurality of sections in the inspection target printed material.

4. The inspection apparatus according to claim 3, wherein:
the starting number, the ascending or descending order, the offset, and a number of digits of a numerical value are settable via the setting screen as inspection settings for the numerical values of sequential numbers, and
the one or more processors generate the reference data, including numerical values of a plurality of sequential numbers that increase or decrease across a plurality of sections in the inspection target printed material according to setting content set via the settings screen.

5. The inspection apparatus according to claim 4, wherein an interval indicating an increase or decrease in a numerical value for each predetermined page is settable via the setting screen as the inspection settings for the numerical values of the sequential numbers.

6. The inspection apparatus according to claim 5, wherein a repeat number for the sequential numbers is settable via the setting screen as the inspection settings for the numerical values of the sequential numbers.

7. The inspection apparatus according to claim 6, wherein whether or not to exclude the inspection region from being an inspection target if blank is settable via the setting screen as the inspection settings for the numerical values of the sequential numbers.

8. The inspection apparatus according to claim 4, wherein for the number of digits that is settable via the settings screen, a portion of digits of numerical values formed in the inspection region is settable.

9. The inspection apparatus according to claim 8, wherein the portion of digits of the number of digits that is settable is displayed on the settings screen, and numerical values of other digits are displayed grayed out.

10. The inspection apparatus according to claim 2, wherein setting content set for the inspection region of the predetermined region is applicable to other regions via the settings screen.

11. The inspection apparatus according to claim 2, wherein an orientation of a character in a region set as the inspection region is settable via the settings screen.

12. The inspection apparatus according to claim 2, wherein data defined by a predetermined rule included in the inspection region corresponds to numerical values derived using a predetermined function.

13. The inspection apparatus according to claim 2, wherein data defined by a predetermined rule included in the inspection region corresponds to date and time information indicating at least one of date or time.

14. The inspection apparatus according to claim 1, wherein:
the inspection apparatus is connectable to an image forming apparatus that outputs the inspection target printed material, and
the one or more processors execute instructions to:
output a defect inspection result to the image forming apparatus; and
stop printing from being performed in a state where the image forming apparatus receives the defect inspection result that indicates detection of a defect.

15. The inspection apparatus according to claim 14, wherein:
the inspection apparatus is further connectable to a finisher that executes post-processing on the inspection target printed material, and
the one or more processors execute the instructions to:
output the defect inspection result to the finisher; and
cause the finisher to divide and output normal printed materials and printed materials with a defect.

16. A control method for an inspection apparatus comprising:
obtaining target data from a scanner reading an inspection target printed material;
setting a sequential number inspection, including setting a starting number, an ascending or descending order, and an offset indicating an increase or decrease in a numerical value of the sequential number inspection for an inspecting number formed on the inspection target printed material;
generating reference data in accordance with the set starting number, the set ascending or descending order, and the set offset; and detecting a defect in the inspection target printed material by comparing the obtained target data and the generated reference data.

17. A non-transitory computer-readable storage medium storing a computer program executable by a computer to execute a control method comprising:

obtaining target data from a scanner reading an inspection target printed material;

setting a sequential number inspection, including setting a starting number, an ascending or descending order, and an offset indicating an increase or decrease in a numerical value of the sequential number inspection for an inspecting number formed on the inspection target printed material;

generating reference data in accordance with the set starting number, the set ascending or descending order, and the set offset; and detecting a defect in the inspection target printed material by comparing the obtained target data and the generated reference data.

* * * * *